United States Patent
Yuan et al.

(10) Patent No.: US 9,840,631 B2
(45) Date of Patent: Dec. 12, 2017

(54) POLYSILOXANE/FLUORINATED POSS HYBRID COATINGS, PREPARATION AND ANTI-ICING APPLICATION THEREOF

(71) Applicant: Tianjin University, Tianjin (CN)

(72) Inventors: Xiaoyan Yuan, Tianjin (CN); Chao Tao, Tianjin (CN); Kongying Zhu, Tianjin (CN); Chenghao Luo, Tianjin (CN); Yunhui Zhao, Tianjin (CN); Xiaohui Li, Tianjin (CN); Kaiqiang Zhang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/328,153

(22) PCT Filed: Oct. 28, 2014

(86) PCT No.: PCT/CN2014/089720
§ 371 (c)(1),
(2) Date: Jan. 23, 2017

(87) PCT Pub. No.: WO2016/037403
PCT Pub. Date: Mar. 17, 2016

(65) Prior Publication Data
US 2017/0218209 A1    Aug. 3, 2017

(30) Foreign Application Priority Data
Sep. 11, 2014  (CN) .......................... 2014 1 0460735

(51) Int. Cl.
C09K 3/18       (2006.01)
C09D 7/12       (2006.01)
C09D 183/04     (2006.01)

(52) U.S. Cl.
CPC .......... *C09D 7/1233* (2013.01); *C09D 183/04* (2013.01); *C09K 3/18* (2013.01)

(58) Field of Classification Search
CPC ....... C09D 7/1233; C09D 183/04; C09K 3/18
See application file for complete search history.

(56) References Cited

U.S. PATENT DOCUMENTS

| | | | | |
|---|---|---|---|---|
| 7,193,015 B1 * | 3/2007 | Mabry | ................... | B82Y 30/00 525/101 |
| 7,897,667 B2 * | 3/2011 | Mabry | ................... | B82Y 30/00 524/269 |
| 9,249,313 B2 * | 2/2016 | Haddad | ..................... | C07F 7/21 |
| 9,637,658 B2 * | 5/2017 | Nowak | ..................... | B05D 1/02 |
| 2007/0135602 A1 | 6/2007 | Yamahiro et al. | | |
| 2013/0072609 A1 | 3/2013 | Haddad et al. | | |
| 2017/0107413 A1 * | 4/2017 | Wang | ....................... | C09K 3/18 |

FOREIGN PATENT DOCUMENTS

| | | |
|---|---|---|
| CN | 101024751 A | 8/2007 |
| CN | 101657473 A | 2/2010 |
| CN | 101875707 A | 11/2010 |
| CN | 102597118 A | 7/2012 |
| CN | 102775567 A | 11/2012 |
| CN | 103013331 A | 4/2013 |
| CN | 103435742 A | 12/2013 |
| CN | 103725199 A * | 4/2014 |
| CN | 104004191 A | 8/2014 |
| SU | 1442528 A1 | 12/1988 |

OTHER PUBLICATIONS

"Reliability Centered Maintenance of Electric Power", Su Hongchun, China Machine Press, pp. 241, Jan. 31, 2009, Beijing, China.
"Functional POSS-Cointaing Polymers and Their Applications", Zhang Kaiqiang, et al, Progress in Chemistry, pp. 394-402, Mar. 31, 2014, Beijing, China.

* cited by examiner

*Primary Examiner* — Anthony J Green
(74) *Attorney, Agent, or Firm* — Bei & Ocean; George G. Wang

(57) ABSTRACT

The present invention discloses a preparation method for a fluorinated POSS/polysiloxane hybrid coating and the anti-icing application thereof The coating is prepared by mixing fluorinatedpolyhedral oligomericsilsesquioxanes (fluorinated POSS) comprising Si-H bonds and fluoro alkyl chains in the eight vertices with polysiloxane, and subsequently curing via hydrosilylation. Fluorinated POSS aggregates on the surface of the polysiloxane hybrid coating due to the low surface energy fluorinated chains, leading to the generation of micro/nano-sized wrinkles. The wrinkles, together with lubricant, contribute to the low water contact angle hysteresis (as low as 2°) and ice shear strength (as low as 20 kPa). The required materials are easy to obtain, and the preparation is simple and controllable. All the above make it promising as anti-icing coatings.

8 Claims, 1 Drawing Sheet

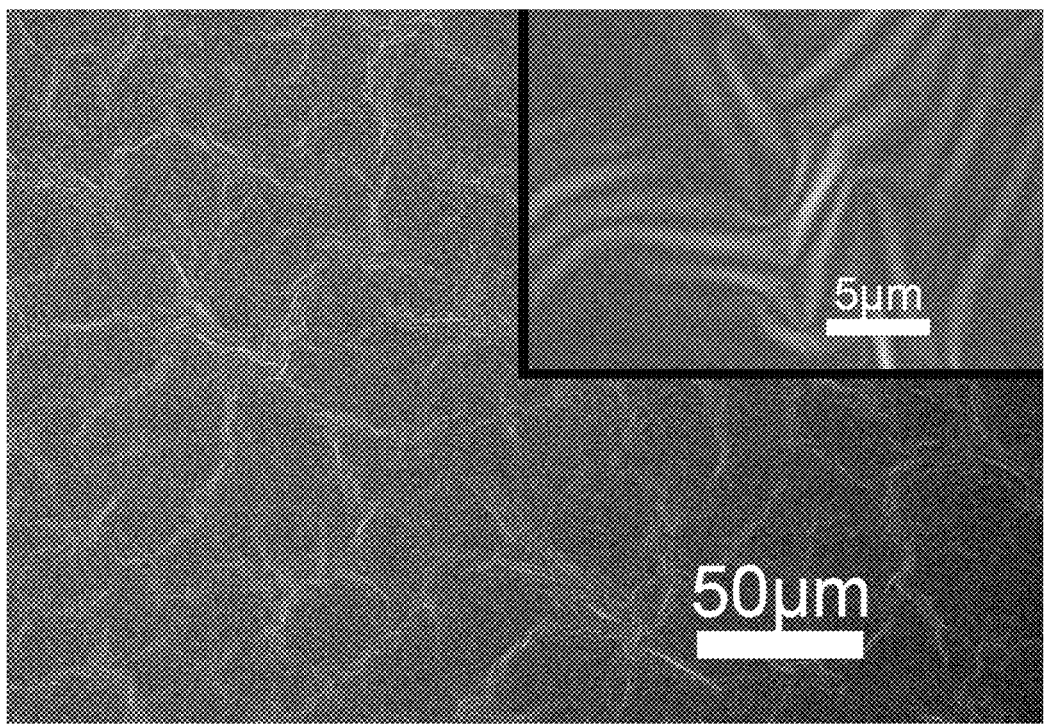

POLYSILOXANE/FLUORINATED POSS HYBRID COATINGS, PREPARATION AND ANTI-ICING APPLICATION THEREOF

FIELD OF THE INVENTION

The present invention relates to a preparation method of polysiloxane hybrid anti-icing coatings containing fluorinated polyhedral oligomeric silsesquioxanes (fluorinated POSS).

BACKGROUND OF THE INVENTION

Ice and frost formation can cause severe destruction and massive casualties, such as the disasters resulted from power supply line fault and aircraft icing. Either anti-icing methods (e.g., anti-icing coatings, etc.) or deicing methods (e.g., directly removing ice by force, spraying deicer or heating, etc.) are available to solve these problems. Anti-icing coating is an important and efficient deicing method. Nowadays, researches on anti-icing coatings mainly focus on low surface energy materials, superhydrophobic surfaces and lubricanting coatings.

Polysiloxane with low surface energy is commonly used as anti-icing materials. For instance, NuSil®2180 was presented as a corrosion-resistant anti-icing coating in US 20070254170 (Hoover K L, Watson C R, Putnam J W, Dolan R C, Bonarrigo B B, Kurz P L, Weisse M A. Erosion resistant anti-icing coatings. US 20070254170, 2007). An anti-icing coating with hydrophobic materials as matrix resin and silicone phase change materials as additives was disclosed in U.S. Pat. No. 7,514,017 (Bhamidipati M V. Methods and compositions for inhibiting surface icing. U.S. 7,514,017, 2009). The sol-gel preparation method of an anti-icing coating with 'interpenetrating network structure' formed by silicone crosslinking network as matrix was disclosed in U.S. Pat. No. 6,702,953 (Simendinger W H, Miller S D. Anti-icing composition. U.S. Pat. No. 6,702,953, 2004), wherein, ice inhibitor such as polyols was included in the system. Sylgard®184 (Dow Corning Co.), an anti-icing product that can be used as matrix resin, is composed of prepolymer and curing agent. The coating can be obtained by crosslinking of the two components based on hydrosilylation (Alizadeh A, Bahadur V, Shang W, ZhuY, Buckley D, Dhinojwala A, Sohal M. Influence of substrate elasticity on droplet impact dynamics. Langmuir, 2013, 29: 4520-4524).

In addition to low surface energy materials, lubricant is capable of efficiently reducing ice shear strength. For example, Aizenberg et al. developed the concept of slippery liquid-infused porous surfaces (SLIPS), the principle thereof takes use of capillarity. In detail, it was involved in a molecular level slippery surface fabricated by infusing fluorinated fluids immiscible with water into the topological structure of the porous surfaces, resulting in low contact angle hysteresis and ice shear strength (Mishchenko L, Hatton B, Bahadur V, Ashley Taylor J, Krupenkin T, Aizenberg J. Design of ice-free nanostructured surfaces based on repulsion of impacting water droplets. ACS Nano, 2010, 4: 7699-7707). A fabrication method of SLIPS was disclosed in US 20140147627/U.S. Pat. No. 9,121,306, in which perfluorinated compounds or organosilicone were utilized as slippery liquids and absorbed into the rough substrate surfaces, forming a stable lubricant layer. The rough surfaces were obtained by topological structures or porous materials. The substrate materials varied in a wide range, including polymers (e.g., PTFE, epoxy resin, polyester, etc.), metals (e.g., Al, etc.) and inorganic ceramics (Aizenberg J, Aizenberg M, Kang SH, Kim P, Tang KY, Wong TS. Slippery surfaces with high pressure stability, optical transparency, and self-healing characteristics. US 20140147627/US 9121306, 2014).

Fluoropolymers, another kind of low surface energy materials, are often applied in hydrophobic/oleophobic modification, making them promising in the anti-icing field. A three-layer anti-icing coating was disclosed in CN 102205680B, in which the inner layer was composed of organosilicone modified epoxy resin, while the middle layer of polyelectrolytes, and the outer layer of fluorine-silicon modified acrylic ester (Huang C, Li Y, Hu M J, Zhao Y M, Liu X H, Li X L, Huang R H, Luo Y B. An anti-icing coating and its fabrication. CN102205680B, 2014).

Polyhedral oligomeric silsesquioxanes (POSS) are organic-inorganic hybrid molecules with an inorganic core surrounded by eight organic groups. The POSS molecules with eight organic fluorinated groups (fluorinated POSS) could combine low surface energy property with functional and nanosized organic-inorganic hybrid molecules. CN 101029137A disclosed a fluorinated POSS-acrylate block copolymer resin and a synthetic method thereof (Dai L Z, Chen J F, Xu Y T, Deng Y M, Peng X L. Fluorinated POSS-acrylate block copolymer and its preparation method. CN 101029137A, 2007). CN 101875707A disclosed a fluorinated POSS-acrylate copolymer and the preparation of the copolymer coatings which exhibited low-surface-energy and good antifouling properties (Leng S W, Hu W , Wu P. Fluorinated POSS-acrylate copolymer and its synthesis and a coating. CN 101875707A, 2010). Moreover, Mabry et al. had successfully synthesized a novel class of octameric fluorinated POSS, the eight organic groups of which were all nonafluorohexyl, tridecafluorooctyl or heptadecafluorodecyl, respectively. According to their publication, fluorinated POSS was the most hydrophobic crystal materials (Mabry J M, Vij A, Iacono S T, Viers B D. Fluorinated polyhedral oligomeric silsesquioxanes (F-POSS). Angewandte Chemie International Edition, 2008, 47: 4137-4140). Superhydrophobic and superoleophobic surfaces were prepared by spraying heptadecafluorodecyl POSS onto PDMS substrates with microsized columns in regular alignment on the surfaces (Golovin K, Lee D H, Mabry J M, Tuteja A. Transparent, flexible, superomniphobic surfaces with ultra-low contact angle hysteresis. Angewandte Chemie International Edition, 2013, 52: 13007-13011). Meuler et al. blended heptadecafluorodecyl POSS with Tecnoflon rubber or poly (ethyl methacrylate) in Asahiklin solvent, respectively and then spin-coated the solution onto steel sheets. The result showed that the ice adhesion strength decreased obviously compared to that of Tecnoflon rubber surface and poly(ethyl methacrylate) surface. Furthermore, the minimum value of the ice adhesion strength and contact angle hysteresis were 165 kPa and 5.6° respectively, when the mixture consisted of 80 wt % poly(ethyl methacrylate) and 20 wt % heptadecafluorodecyl POSS. As a result, fluorinated POSS was proved to be advantageous in improving icephobic properties of coatings and promising in anti-icing field (Meuler A J, Smith J D, Varanasi K K, Mabry J M, McKinley G H, Cohen R E. Relationships between water wettability and ice adhesion. ACS Applied Materials & Interfaces, 2010, 2: 3100-3110).

Surface wrinkles have been widely used in introducing mico/nano-sized topology structures on films. Jiang et al. prepared wrinkled films by photocuring using epoxy resin as substrate and fluoro-POSS with six thiol groups and two heptadecafluorodecyl acrylate groups (F-POSS-SH) as crosslinker. A bilayer crosslinking system, in which click reaction took place in the top layer, while radical polymerization of C=C in the bulk layer, was formed by the migration of F-POSS-SH. As a result, the formation of controllable wrinkle morphology was triggered by different crosslinking methods in two layers (Gan Y, Jiang X, Yin J. Self-wrinkling patterned surface of photocuring coating induced by the fluorinated POSS containing thiol groups (F-POSS-SH) as the reactive nanoadditive. Macromolecules, 2012, 45: 7520-7526). Regular wrinkle patterns were formed by chemical vapor deposition (iCVD) of a rigid film layer on biaxial pretensioning PDMS substrate (Yague JL, Yin J, Boyce MC, Gleason KK. Design of ordered wrinkled patterns with dynamically tuned properties. Physics Procedia, 2013, 46: 40-45).

There appeared more and more studies on the synthesis and applications of fluorinated POSS, but very few results about applying fluorinated POSS as crosslinker to anti-icing field. Moreover, no research on combining fluorinated POSS with lubricant anti-icing mechanism was reported. In this invention, low-surface-energy fluorinated POSS was introduced into the polysiloxane system and micro/nano-sized surface wrinkles were formed by controlling crosslinking degree. In addition, three-phase interface with ice/lubricant/solid coating surface was obtained due to hydrogen-containing polysiloxane in this system, which comparatively reduced the contact area of ice bulk and solid coating surface. Ice adhesion strength of coatings greatly decreased through the combination of surface wrinkle and lubricanting layer, significantly improving icephobic properties.

SUMMARY OF THE INVENTION

The present invention is intended to provide a polysiloxane hybrid anti-icing coating containing fluorinated polyhedral oligomeric silsesquioxanes (hereinafter referred to as fluorinated POSS). The materials involved in the invention are easy to prepared, and the preparation process is simple and controllable.

The present invention discloses the polysiloxane/fluorinated POSS hybrid anti-icing coatings prepared by mixing fluorinated POSS comprising Si-H bonds and fluoro alkyl chains in the eight vertices with polysiloxane, and subsequently curing via hydrosilylation. In other words, fluorinated POSS is introduced into two-component polysiloxane system, and cured with hydrogen-containing polysiloxane and vinyl polysiloxane. fluorinated POSS aggregated on the coating surfaces due to the migration of low surface energy fluoro alkyl chains, resulting in micro/nano-sized wrinkles on the surfaces and thus reducing values of contact angle hysteresis and ice shear strength.

In the polysiloxane/fluorinated POSS hybrid anti-icing coatings mentioned above, vinyl polysiloxane acts as the substrate material, while hydrogen-containing polysiloxane participates in crosslinking reaction and also works as a lubricant between water/ice and solid coating surfaces as well. The topological structures of micro/nano-sized surface reduce contact area between water/ice and surfaces, so that the icephobic property will be improved.

The purpose of the invention is achieved by combining fluorinated POSS with polysiloxane. The components and mass percentage each are listed as follows (all the mass percentages add up to 100%).

Fluorinated polyhedral oligomeric silsesquioxanes (fluorinated POSS): 1-25%;
Hydrogen-containing polysiloxane: 5-30%;
Vinyl polysiloxane: 10-50%;
Catalyst: 0.0001%
The rest is solvent.

The structure of fluorinated POSS mentioned above is as follows.

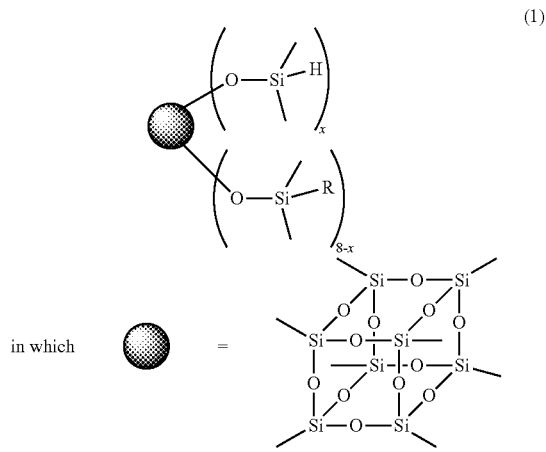

where, x represents the number of remaining Si-H groups, 2<x<6, R is one of —CH$_2$CH$_2$(CF$_2$)$_y$CF$_3$ or —CH$_2$CH(CH$_3$)COOR$_f$, wherein y=3, 5, 7 or 9, and R$_f$ comprises one of —CH$_2$CF$_2$CHFCF$_3$, —CH$_2$CH$_2$(CF$_2$)$_4$CHFCF$_3$, —CH$_2$CH$_2$(CF$_2$)$_5$CF$_3$ and —CH$_2$CH$_2$(CF$_2$)$_7$CF$_3$ groups. x is analyzed by $^1$H NMR, that is, calculated by integral areas of two H characteristic peaks of —SiH and methylene in —OSi(CH$_3$)$_2$CH$_2$— in the $^1$H NMR spectra of fluorinated POSS. The result is an average value of a plurality of fluorinated POSS molecules.

The structure of hydrogen-containing polysiloxane mentioned above is

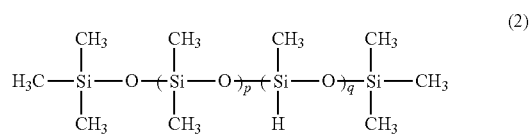

where, p/q=1~5. Its molecular weight ranges from 2000 to 3000 g/mol.

The structure of vinyl polysiloxane mentioned above is

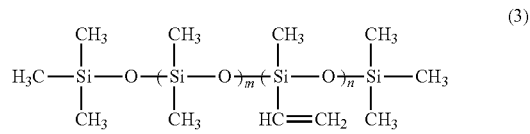

where, m/n=5~10. Its molecular weight ranges from 25000 to 30000 g/mol.

The catalyst used in the polysiloxane/fluorinated POSS hybrid anti-icing coatings comprises one selected from the group consisting of Karstedts catalyst and chloroplatinic acid catalyst.

The solvent used in the polysiloxane/fluorinated POSS hybrid anti-icing coatings mentioned above comprises one selected from the group consisting of toluene, xylene, benzotrifluoride, dichloromethane, trichloromethane and tetrahydrofuran.

The preparation method of the polysiloxane/fluorinated POSS hybrid anti-icing coatings mentioned above is as follows.

Dissolving fluorinated POSS, hydrogen-containing polysiloxane, vinyl polysiloxane, catalyst in the solvent according to the mass percentages above and ultrasonic stirring for 1 to 2 h to obtain the homogeneous transparent solution; Coating certain amount of the solution on the substrate under room temperature for surface-drying, and crosslinking in an oven at temperatures of 80~120° C. for 2~4 h: Finally the polysiloxane/fluorinated POSS hybrid anti-icing coatings are obtained.

The coating method is selected from casting, spin coating, spraying and dip coating.

Fluorinated polyhedral oligomeric silsesquioxanes with Si-H bonds and fluoro alkyl chains (fluorinated POSS) is synthesized according to the method reported in the reference "Dutkiewicz M, Maciejewski H, Marciniec B, Karasiewicz J. New fluorocarbofunctional spherosilicates: synthesis and characterization. Organometallics, 2011, 30: 2149-2153":

Dissolving octakis(dimethylsiloxy)-T8-silsequioxane (OS-POSS) and perfluotinated olefins or perfluoroalkyl methacrylate in the solvent which is selected from the group consisting of toluene, xylene, benzotrifluoride, dichloromethane, trichloromethane and tetrahydrofuran to form a 10~50 wt % solution under magnetic stirring; Introducing $N_2$ gas for 30 min to remove the air in the system, then adding Karstedts' catalyst or chloroplatinic acid catalyst into the solution dropwise and stirring at temperatures of 20~100° C. for 36~72 h. After reaction finished, distillating the solution at reduced pressure, and vacuum-drying to remove the unreacted monomer and the solvent toluene as well. Finally, fluorinated polyhedral oligomeric silsesquioxanes (fluorinated POSS) is obtained with a yield of 98%.

Methods of characterizations of wettability, icephobicity and wrinkle morphology are as follows.

Advancing angles (AA), receding angles (RA) and the related wettability values are measured on a Contact Angle Meter (JC2000D, Shanghai, China) by five points fitting method. Contact angle hysteresis is further calculated by the difference between AA and RA. Testing method of AA (or RA) is as follows. Dropping a 5 μL water drop on a coating surface, then continuously adding/sucking the water at a rate of 0.1 μL/s by a micro-injector, until the contact line at both sides of the water drop on the coating surface changes. Thus, the biggest contact angle when increasing the water drop is the corresponding value of AA, and the smallest contact angle when sucked the water drop is referred to as RA. The difference between the AA and RA values is the contact angle hysteresis value.

Ice shear strength is tested by lateral pushing method with a push&pull tester (Imada ZP-SOON, Japan) and a cryo-console. The testing method is as follows. Fixing 10 samples per group on a cryo-console and placing a hydrophobic hollow cylinder which is previously treated with 1H,1H,2H,2H-perfluorooctyltrichlorosilane (radius 5 mm) on each sample. Leaving the cylinder with 450 μL ultrapure water inside in a weather chamber with a $N_2$ inlet at −15° C. for 2 h to form an ice column. Wherein the contact area of sample and ice column is S=78.5mm$^2$, and the cooling speed is 2° C./min. The digital pull&push tester is fixed on a mobile station, moving forward at the speed of 0.5mm/s. The distance between the probe of the tester and coating surface is less than 2 mm. The maximum shear force F is recorded, and ice shear strength is further calculated by equation 6=F/S. The final value is determined by the average of 10 samples.

The surface wrinkle morphology is observed under scanning electron microscope (SEM) (S-4800, Hitachi Limited, Japan) and atomic force microscope (AFM) (CSPM5500A of Being Nano-Instruments Ltd. Guangzhou, China), wherein the magnification of SEM ranges from 400 to 5000 and the operation mode of AFM is tapping mode.

The effect of fluorinated POSS and the reason why wrinkles form on the prepared coatings in the invention are as follows. Introduction of fluorinated POSS could decrease surface energy of the system, and facilitate formation of micro/nano sized roughness. In addition, fluorinated POSS could migrate and aggregate the surface due to its low surface energy, leading to a bilayer crosslinking structure in which the top layer is composed of fluorinated POSS and vinyl polysiloxane, while the bulk layer is of hydrogen-containing polysiloxane and vinyl polysiloxane. The formation of bilayer crosslinking structure completely depends on the self-aggregation of fluorinated POSS. As a result, the demarcation line of the two layers is not obvious enough, which means there is a little amount of fluorinated POSS in the bulk layer with a gradient distribution as depth changes. The different crosslinking degree and hardness caused by the rigid fluorinated POSS molecules between two layers induced mismatch in volumetric shrinkage inside the films, creating a compressive stress. Finally, the compressive stress caused wrinkling patterns on the surfaces. The wrinkle morphology, together with fluorinated POSS molecules, provided micro/nano sized roughness for the coatings, resulting in smaller contact area between ice and the solid surface. Consequently, the adhesion force between ice and the coating surface become weaker.

The lubrication in this invention is as follows. Inside the coating low molecular weight polysiloxane is remained due to incomplete crosslinking, and the coatings are filled with lubricating oil through the crosslinked network and covered with a lubricating layer. On account of the lubrication effect between water/ice and coating surface, ultralow water contact angle hysteresis and ice shear strength are obtained. Furthermore, in the bilayer crosslinking structure, fluorinated POSS in the top layer is quickly cured with vinyl polysiloxane when heated, while hydrogen-containing polysiloxane in the bulk layer crosslinks with the rest vinyl polysiloxane because of the delay of heat transfer. A small amount of hydrogen-containing polysiloxane is left unreacted by the limited vinyl content, and its amount can be controlled by the dosage of fluorinated POSS, hydrogen-containing polysiloxane and vinyl polysiloxane and ratio of functional groups.

Meuler and his coworkers tested the water AA, RA and ice shear strength of a series of low surface energy polymer coatings and polymer/POSS hybrid coatings. The results show the ice shear strength of a majority of coatings ranging from 165 to 510 kPa, while water contact angle hysteresis from 5.6° to 44.6° (Meuler A J, Smith J D, Varanasi K K, Mabry J M, McKinley G H, Cohen R E. Relationships between water wettability and ice adhesion. ACS Applied Materials&Interfaces, 2010, 2: 3100-3110). Moreover, the ice shear strength of SLIPS can reach 40 kPa (Mishchenko L, Hatton B, Bahadur V, Ashley Taylor J, Krupenkin T, Aizenberg J. Design of ice-free nanostructured surfaces based on repulsion of impacting water droplets.ACS Nano, 2010, 4: 7699-7707). In this invention, the polysiloxane/fluorinated POSS hybrid anti-icing coatings exhibit extremely low contact angle hysteresis (as low as)2° and ice shear strength (as low as 20 kPa), which makes them promising in applications such as hydrophobic or anti-icing coatings.

BRIEF DESCRIPTION OF THE DRAWINGS

The FIGURE is a SEM image of the coating surface in example 1.

DETAILED DESCRIPTION OF THE INVENTION

The present invention will be described in detail in combination with the accompanying embodiments.

EXAMPLE 1

(1) Synthesis of Fluorinated POSS:

Mixing 20 g octakis(dimethylsiloxy)-T8-silsequioxane and 34g tridecafluorooctyl methacrylate in 54 g toluene in a three-neck flask to form 50 wt % solution, then adding magnon for magnetic stirring, and introducing $N_2$ gas for 30 min to remove air in the system, then adding 50 μg Karstedts' catalyst into the solution dropwise for stirring at 60° C. for 48 h. After reaction finishes, applying reduced pressure distillation and vacuum drying to remove unreacted monomer and solvent to obtain the crude product. The crude product was vacuum dried for 24 h and fluorinated POSS (quadri ({3,3,4,4,5,5,6,6,7,7,8,8-tridecafluorooctyloxy carbonyl-methyl ethyl} dimethysilyl) quadri (dimethysilyl) polyhedral oligomeric silsesquioxanes) was obtained. The structure was as follows:

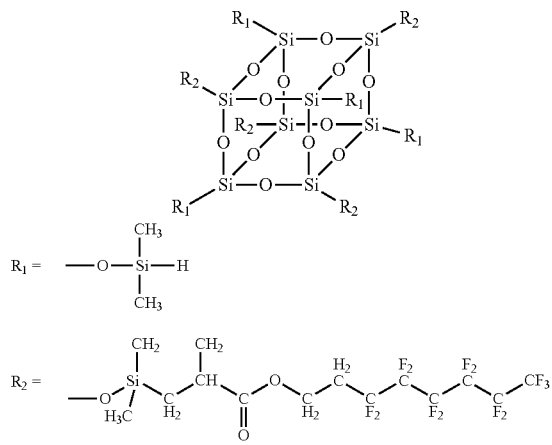

(2) Preparation of Polysiloxane/fluorinated POSS Hybrid Anti-Icing Coatings:

Mixing the 10 g prepared fluorinated POSS with 10 g poly(methylhydrosiloxane) (whose molecular weight is of 2000 to 2500g/mol, p/q=1) and 10 g poly(methylvinylsiloxane) (which molecular weight is of 25000 to 28000g/mol, m/n=5) in 70 g benzotrifluoride in a beaker to form a 30 wt % solution, and adding 100 μg Karstedts' catalyst into the solution, then adding magnon for magnetic stirring for 1 h till the solution became homogeneous transparent. The coating was prepared by casting the 26 mL solution on a 20 cm×20 cm aluminium slide and curing at 80° C. for 3 h in an oven after surface drying for 1 h at room temperature.

The contact angle hysteresis of the prepared coating is 2°, while ice shear strength of 25 kPa and water contact angle of 105°. According to SEM and AFM images, the wrinkle width is around 1.2 μm, while the distance between adjacent wrinkles around 1.1 μm. The FIGURE shows the SEM image of the coating.

EXAMPLE 2

(1) Synthesis of Fluorinated POSS:

Mixing 20 g octakis(dimethylsiloxy)-T8-silsequioxane and 19.6 g hexafluorobutyl methacrylate in 356.4 g toluene in a three-neck flask to form 10 wt % solution, then adding magnon for magnetic stirring, and introducing a $N_2$ gas for 30 min to remove air in the system. Then adding 50 μg Karstedts' catalyst into the solution dropwise for stirring at 20° C. for 72 h. After reaction finishes, applying reduced pressure distillation and vacuum drying to remove unreacted monomer and solvent to obtain crude product. The crude product was vacuum dried for 24 h and fluorinated POSS (quadri ({2,2,3,4,4,4-hexafluorobutoxy carbonyl-methyl ethyl} dimethysilyl) quadri (dimethysilyl) polyhedral oligomeric silsesquioxanes) was collected. The structure was as follows:

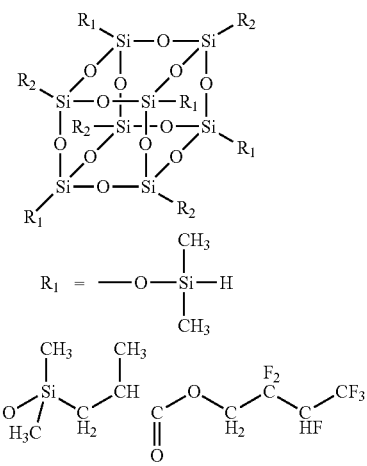

(2) Preparation of Polysiloxane/Fluorinated POSS Hybrid Anti-Icing Coatings

Mixing 25 g prepared fluorinated POSS with 25 g poly (methylhydrosiloxane) (which molecular weight is of 2000 to 2500 g/mol, p/q=1) and 25 g poly(methylvinylsiloxane) (whose molecular weight is of 25000 to 28000 g/mol, m/n=5) in 25 g benzotrifluoride in a beaker to form 75 wt % solution, and adding 100 μg chloroplatinic acid catalyst into the solution, then adding magnon for magnetic stirring for 1 h till the solution became homogeneous transparent. The coating was prepared by casting the 11 mL solution on a 20 cm×20 cm aluminium slide and curing at 80° C. for 4 h in an oven after surface drying for 1 h at room temperature.

The contact angle hysteresis of the prepared coating is 5°, while ice shear strength is of 49 kPa and water contact angle is of 103°. According to SEM and AFM images, the wrinkle width is around 600 nm, while the distance between adjacent wrinkles around 600 nm.

EXAMPLE 3

(1) Synthesis of Fluorinated POSS:

Mixing 20 g octakis(dimethylsiloxy)-T8-silsequioxane and 31.4 g dodecafluoroheptyl methacrylate in 205.6 g toluene in a three-neck flask to form 20 wt % solution, then adding magnon for magnetic stirring, and introducing a $N_2$ gas for 30 min to remove air in the system, then adding 50 μg Karstedts' catalyst into the solution dropwise for stirring at 30° C. for 72 h. After reaction finishes, applying reduced pressure distillation and vacuum drying to remove unreacted monomer and solvent and to obtain crude product. The crude product was vacuum dried for 24 h and fluorinated POSS (quadri ({2,2,3,3,4,4,5,5,6,6,7,7-dodecafluoroheptoxy carbonyl-methyl ethyl} dimethysilyl) quadri (dimethysilyl) polyhedral oligomeric silsesquioxanes) was collected. The structure was as follows:

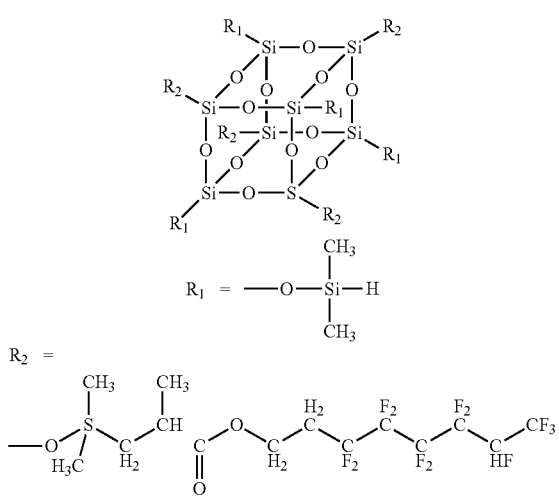

(2) Preparation of Polysiloxane/Fluorinated POSS Hybrid Anti-Icing Coatings:

Mixing 20 g prepared fluorinated POSS with 10 g poly (methylhydrosiloxane) (whose molecular weight is of 2000 to 2500 g/mol, p/q=1) and 40 g poly(methylvinylsiloxane) (whose molecular weight is of 25000 to 28000 g/mol, m/n=5) in 30 g benzotrifluoride in a beaker to form 70 wt % solution, and adding 100 Karstedts' catalyst into the solution, then ultrasonic stirring for 2 h till the solution became homogeneous transparent. The coating was prepared by casting the 15 mL solution on a 20 cm×20 cm aluminium slide and curing at 90° C. for 3 h in an oven after surface drying for 1 h at room temperature.

The contact angle hysteresis of the prepared coating is 4.5°, while ice shear strength is of 40 kPa and water contact angle is of 104°. According to SEM and AFM images, the wrinkle width is around 900 nm, while the distance between adjacent wrinkles around 950 nm.

EXAMPLE 4

(1) Synthesis of Fluorinated POSS:

Mixing 20 g octakis(dimethylsiloxy)-T8-silsequioxane and 25.5 g tridecafluorooctyl methacrylate in 166 g toluene in a three-neck flask to form 30 wt % solution, then adding magnon for magnetic stirring, and introducing a $N_2$ gas for 30 min to remove air in the system; then adding 50 μg Karstedts' catalyst into the solution dropwise for stirring at 40° C. for 72 h. After reaction finishes, applying reduced pressure distillation and vacuum drying to remove unreacted monomer and solvent and to obtain crude product. The crude product was vacuum dried for 24 h and fluorinated POSS (tri ({3,3,4,4,5,5,6,6,7,7,8,8-tridecafluorooctyloxy carbonyl-methyl ethyl} dimethysilyl) pent (dimethysilyl) polyhedral oligomeric silsesquioxanes) was collected. The calculating method of fluoro-containing groups in fluorinated POSS is shown as follows: as is shown in Table 1:

TABLE 1

Chemical shift of corresponding groups in the spectrum of $^1$H NMR

| Chemical shift | Chemical groups | Average number of H in every POSS molecule |
|---|---|---|
| 0.17 | Si(CH$_3$) | 48 |
| 0.83, 1.06 | SiMe$_2$CH$_2$ | 6 |
| 1.22 | CH$_3$ | 9 |
| 2.51 | CHCO | 3 |
| 4.33 | OCH$_2$ | 6 |
| 4.42 | CH$_2$ | 6 |
| 4.72 | SiH | 5 |

The proton integration ratio of characteristic peak at 0.83 or 1.06 ppm and SiH at 4.72 ppm reflects the ratio of numbers of H in two different positions, which also represents the ratio of fluoro-containing groups with SiH. There being eight groups in total, the number of fluoro-containing groups in every fluorinated POSS molecule is three in average by calculation. The calculating method in other examples is the same as above.

The structure was as follows:

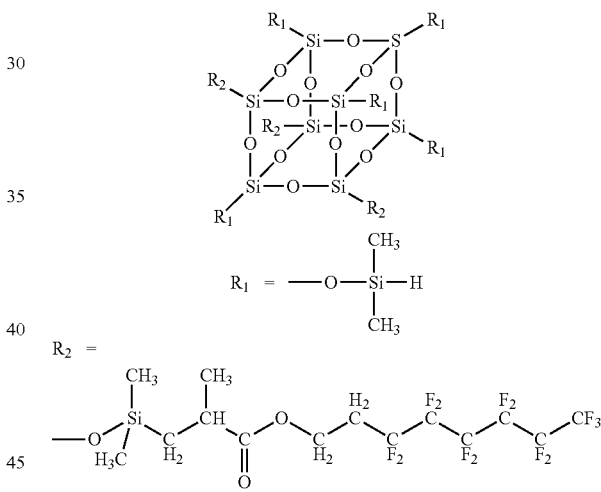

(2) Preparation of Polysiloxane/Fluorinated POSS Hybrid Anti-Icing Coatings:

Mixing 9 g prepared fluorinated POSS with 21 g poly (methylhydrosiloxane) (whose molecular weight is of 2000 to 2500 g/mol, p/q=1) and 30 g poly(methylvinylsiloxane) (whose molecular weight is of 25000 to 28000 g/mol, m/n=5) in 40 g xylene in a beaker to form 60 wt % solution, and adding 100 μg chloroplatinic acid catalystinto the solutionfor ultrasonic stirring for 1 h till the solution became homogeneous transparent. The coating was prepared by casting the 13 mL solution on a 20 cm×20 cm aluminium slide and curing at 100° C. for 3 h in an oven after surface drying for 1 h at room temperature.

The contact angle hysteresis of the prepared coating is 3°, while ice shear strength is of 20 kPa and water contact angle is of 105°. According to SEM and AFM images, the wrinkle width is around 1.1 μm, while the distance between adjacent wrinkles around 1.1 μm.

EXAMPLE 5

(1) Synthesis of Fluorinated POSS:

Mixing 20 g octakis(dimethylsiloxy)-T8-silsequioxane and 41.8 g heptadecafluorodecyl methacrylate in 92.7 g toluene in a three-neck flask to form 40 wt % solution, then adding magnon for magnetic stirrinng, and introducing a $N_2$ gas for 30 min to remove air in the system, and adding 50 μg Karstedts' catalyst into the solution dropwise for stirring at 50° C. for 72 h. After reaction finishes, applying reduced pressure distillation and vacuum drying to remove unreacted monomer and solvent and to obtain the crude product. The crude product was vacuum dried for 24 h and fluorinated POSS (quadri ({3,3,4,4,5,5,6,6,7,7,8,8,9,9,10,10,10-heptadecafluorodecyloxy carbonyl-methyl ethyl} dimethysilyl) quadri (dimethysilyl) polyhedral oligomeric silsesquioxanes) was collected. The structure was as follows:

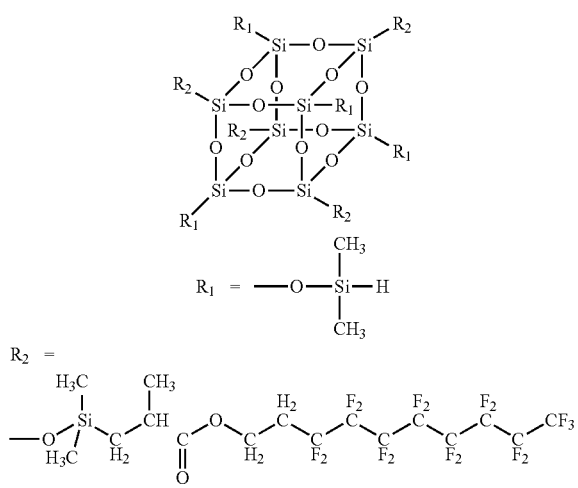

(2) Preparation of Polysiloxane/Fluorinated POSS Hybrid Anti-Icing Coatings:

Mixing the 5 g prepared fluorinated POSS with 20 g poly(methylhydrosiloxane) (whose molecular weight is of 2000 to 2500 g/mol, p/q=1) and 25 g poly(methylvinylsiloxane) (whose molecular weight is of 25000 to 28000 g/mol, m/n=5) in 50 g dichloromethane in a beaker to form 50 wt % solution, and adding 100 μg Karstedts' catalyst into the solution, then adding magnon for ultrasonic stirring for 1 h till the solution became homogeneous transparent. The coating was prepared by casting the 19 mL solution on a 20 cm×20 cm aluminium slide and curing at 110° C. for 2 h in an oven after surface drying for 1 h at room temperature.

The contact angle hysteresis of the prepared coating is 7°, while ice shear strength is of 50 kPa and water contact angle is of 105°. According to SEM and AFM images, the wrinkle width is around 1.3 μm, while the distance between adjacent wrinkles around 1.6 μm.

EXAMPLE 6

(1) Synthesis of Fluorinated POSS:

Mixing 20 g octakis(dimethylsiloxy)-T8-silsequioxane and 19.3 g (perfluorobutyl)ethylene in 39 g xylene in a three-neck flask to form 50 wt % solution, then adding magnon for magnetic stirring, and introducing a $N_2$ gas for 30 min to remove air in the system, and adding 50 μg Karstedts' catalystinto the solution dropwise for stirring at 60° C. for 48 h. After reaction finishes, applying reduced pressure distillation and vacuum drying to remove unreacted monomer and solvent and to obtain crude product. The crude product was vacuum dried for 24 h and fluorinated POSS (quadri ({3,3,4,4,5,5,6,6,6-nonafluorohexane} dimethysilyl) quadri (dimethysilyl) polyhedral oligomeric silsesquioxanes) was collected. The structure was as follows:

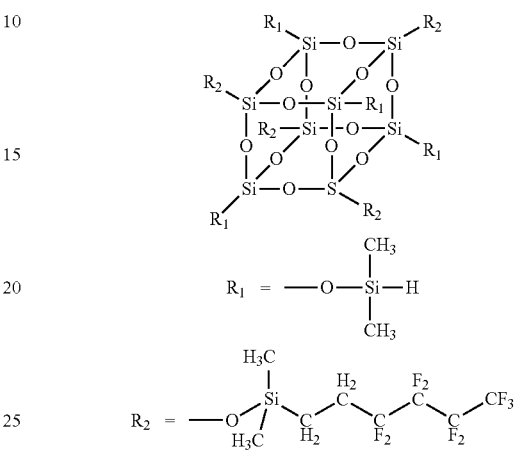

(2) Preparation of Polysiloxane/Fluorinated POSS Hybrid Anti-Icing Coatings:

Mixing 9 g prepared fluorinated POSS with 9 g poly (methylhydrosiloxane) (whose molecular weight is of 2000 to 2500 g/mol, p/q=1) and 36 g poly(methylvinylsiloxane) (whose molecular weight is of 25000 to 28000 g/mol, m/n=5) in 50 g chloroform in a beaker to form 56 wt % solution, and adding 100 μg Karstedts' catalyst into the solution, then adding magnon for ultrasonic stirring for 1 h till the solution became homogeneous transparent. The coating was prepared by casting the 15 mL solution on a 20 cm×20 cm aluminium slide and curing at 120° C. for 2 h in an oven after surface drying for 1 h at room temperature.

The contact angle hysteresis of the prepared coating is 5.2°, while ice shear strength is of 46 kPa and water contact angle is of 104°. According to SEM and AFM images, the wrinkle width is around 760 nm, while the distance between adjacent wrinkles around 750 nm.

EXAMPLE 7

(1) Synthesis of Fluorinated POSS:

Mixing 20 g octakis(dimethylsiloxy)-T8-silsequioxane and 27.2 g (perfluorohexyl)ethylene in 188.8 g benzotrifluoride in a three-neck flask to form 20 wt % solution, then adding magnon for magnetic stirring, and introducing a $N_2$ gas for 30 min to remove air in the system, then adding 50 μg Karstedts' catalyst into the solution dropwise for stirring at 70° C. for 48 h. After reaction finishes, applying reduced pressure distillation and vacuum drying to remove unreacted monomer and solvent and to obtain crude product. The crude product was vacuum dried for 24 h and fluorinated POSS (quadri ({3,3,4,4,5,5,6,6,7,7,8,8,8-tridecafluorooctane} dimethysilyl) quadri (dimethysilyl) polyhedral oligomeric silsesquioxanes) was collected. The structure was as follows:

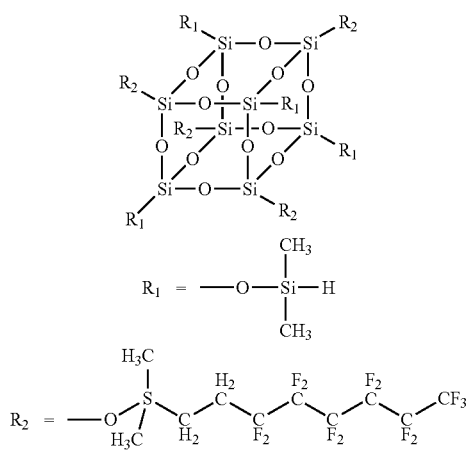

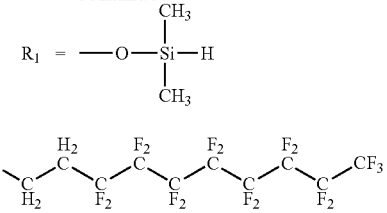

(2) Preparation of Polysiloxane/Fluorinated POSS Hybrid Anti-Icing Coatings:

Mixing 5 g prepared fluorinated POSS with 20 g poly(methylhydrosiloxane) (whose molecular weight is of 2000 to 2500 g/mol, p/q=1) and 50 g poly(methylvinylsiloxane) (whose molecular weight is of 25000 to 28000 g/mol, m/n=5) in 25 g tetrahydrofuran in a beaker to form 75 wt % solution, and adding 100 μg chloroplatinic acid catalyst into the solution, then adding magnon for ultrasonic stirring for 1 h till the solution became homogeneous transparent. The coating was prepared by casting the 15 mL solution on a 20 cm×20 cm aluminium slide and curing at 80° C. for 4 h in an oven after surface drying for 1 h at room temperature.

The contact angle hysteresis of the prepared coating is 4°, while ice shear strength 27 kPa and water contact angle 105°. According to SEM and AFM images, the wrinkle width is around 1.0 μm, while the distance between adjacent wrinkles around 1.0 μm.

EXAMPLE 8

(1) Synthesis of Fluorinated POSS:

Mixing 20 g octakis(dimethylsiloxy)-T8-silsequioxane and 35.1 g (perfluorooctyl) ethylene in 56.3 g dichloromethane in a three-neck flask to form 40 wt % solution, then adding magnon for magnetic stirring, and introducing a N₂ gas for 30 min to remove air in the system, then adding 50 μg Karstedts' catalyst into the solution dropwise for stirring at 80° C. for 36 h. After reaction finishes, applying reduced pressure distillation and vacuum drying to remove unreacted monomer and solvent and to obtain crude product. The crude product was vacuum dried for 24 h and fluorinated POSS (quadri ({3,3,4,4,5,5,6,6,7,7,8,8,9,9,10,10,10-heptadecafluorodecane} dimethysilyl) quadri (dimethysilyl) polyhedral oligomeric silsesquioxanes) was collected. The structure was as follows:

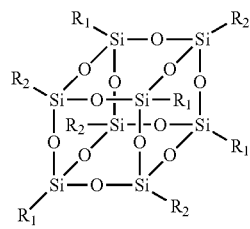

(2) Preparation of Polysiloxane/Fluorinated POSS Hybrid Anti-Icing Coatings:

Mixing 8 g prepared fluorinated POSS with 12 g poly(methylhydrosiloxane) (whose molecular weight is of 2500 to 3000 g/mol, p/q=1) and 20 g poly(methylvinylsiloxane) (whose molecular weight is of 28000 to 30000 g/mol, m/n=5) in 60 g xylene in a beaker to form 40 wt % solution, and adding 100 μg Karstedts' catalyst into the solution, then ultrasonic stirring for 1 h till the solution became homogeneous transparent. The coating was prepared by casting the 19 mL solution on a 20 cm×20 cm aluminium slide and curing at 90° C. for 3 h in an oven after surface drying for 1 h at room temperature.

The contact angle hysteresis of the prepared coating is 8°, while ice shear strength is of 52 kPa and water contact angle is of 105°. According to SEM and AFM images, the wrinkle width is around 1.4 μm, while the distance between adjacent wrinkles around 1.7 μm.

EXAMPLE 9

(1) Synthesis of Fluorinated POSS:

Mixing 20 g octakis(dimethylsiloxy)-T8-silsequioxane and 23.6 g dodecafluoroheptyl methacrylate in 65.4 g dichloromethane in a three-neck flask to form 40 wt % solution, then adding magnon for magnetic stirring, and introducing a N₂ gas for 30 min to remove air in the system, then adding 50 μg Karstedts' catalyst into the solution dropwise for stirring at 80° C. for 36 h. After reaction finishes, applying reduced pressure distillation and vacuum drying to remove unreacted monomer and solvent and to obtain crude product. The crude product was vacuum dried for 24 h and fluorinated POSS (tri ({2,2,3,3,4,4,5,5,6,6,7,7-dodecafluoroheptoxy carbonyl-methyl ethyl} dimethysilyl) pent (dimethysilyl) polyhedral oligomeric silsesquioxanes) was collected. The structure was as follows:

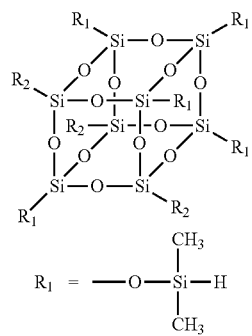

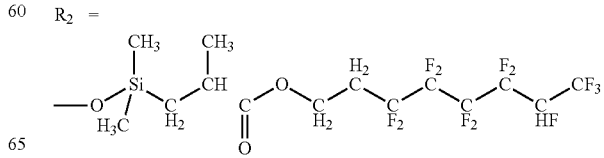

(2) Preparation of Polysiloxane/Fluorinated POSS Hybrid Anti-Icing Coatings:

Mixing 5 g prepared fluorinated POSS with 5 g poly(methylhydrosiloxane) (whose molecular weight is of 2000 to 2500 g/mol, p/q=1) and 10 g poly(methylvinylsiloxane) (whose molecular weight is of 28000 to 30000 g/mol, m/n=5) in 80 g benzotrifluoride in a beaker to form 20 wt % solution, and adding 100 μg Karstedts' catalyst into the solution, then ultrasonic stirring for 1 h till the solution became homogeneous transparent. The coating was prepared by casting the 40 mL solution on a 20 cm×20 cm aluminium slide and curing at 110° C. for 2 h in an oven after surface drying for 1 h at room temperature.

The contact angle hysteresis of the prepared coating is 3.5°, while ice shear strength is of 35.7 kPa and water contact angle is of 104°. According to SEM and AFM images, the wrinkle width is around 800 nm, while the distance between adjacent wrinkles around 850 nm.

EXAMPLE 10

(1) Synthesis of Fluorinated POSS:

Mixing 20 g octakis(dimethylsiloxy)-T8-silsequioxane and 29.5 g hexafluorobutyl methacrylate in 115.5 g toluene in a reactor to form 30 wt % solution, then adding magnon for magnetic stirring, and introducing a $N_2$ gas for 30 min to remove air in the system, then adding 50 μg chloroplatinic acid catalyst into the solution dropwise for stirring at 80° C. for 12 h. After reaction finishes, applying reduced pressure distillation and vacuum drying to remove unreacted monomer and solvent and to obtain crude product. The crude product was vacuum dried for 24 h and fluorinated POSS (hexa ({2,2,3,4,4,4-hexafluorobutoxy carbonyl-methyl ethyl} dimethysilyl) bi (dimethysilyl) polyhedral oligomeric silsesquioxanes) was collected. The structure was as follows:

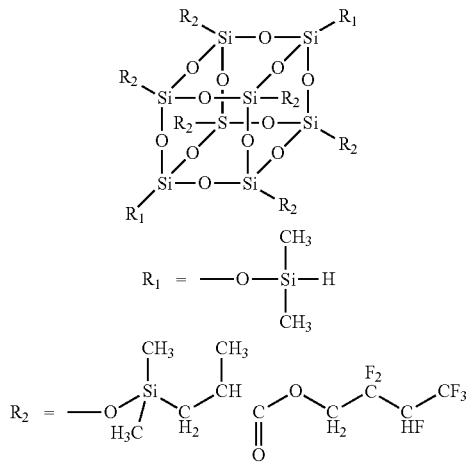

(2) Preparation of polysiloxane/fluorinated POSS hybrid anti-icing coatings:

Mixing 2 g prepared fluorinated POSS with 13 g poly(methylhydrosiloxane) (whose molecular weight is of 2500 to 3000 g/mol, p/q=1) and 15 g poly(methylvinylsiloxane) (whose molecular weight is of 28000 to 30000 g/mol, m/n=5) in 70 g benzotrifluoride in a beaker to form 30 wt % solution, and adding 100 μg chloroplatinic acid catalyst into the solution, then ultrasonic stirring for 1 h till the solution became homogeneous transparent. The coating was prepared by dipping a 20 cm×20 cm aluminium slide in the solution and curing at 80° C. for 3 h in an oven after surface drying for 1 h at room temperature.

The contact angle hysteresis of the prepared coating is 6°, while ice shear strength 50 kPa and water contact angle 103°. According to SEM and AFM images, the wrinkle width is around 550 nm, while the distance between adjacent wrinkles around 580 nm.

EXAMPLE 11

(1) Synthesis of Fluorinated POSS:

Mixing 20 g octakis(dimethylsiloxy)-T8-silsequioxane and 20.9 g heptadecafluorodecyl methacrylate in 95.4g toluene in a reactor to form 30 wt % solution, then adding magnon for magnetic stirring, and introducing a $N_2$ gas for 30 min to remove air in the system, then adding 50 μg Karstedts' catalyst into the solution dropwise to stir at 80° C. for 12 h. After reaction finishes, applying reduced pressure distillation and vacuum drying to remove unreacted monomer and solvent and to obtain crude product. The crude product was vacuum dried for 24 h and fluorinated POSS (quadri ({3,3,4,4,5,5,6,6,7,7,8,8,9,9,10,10,10-heptadecafluorodecyloxy carbonyl-methyl ethyl} dimethysilyl) quadri (dimethysilyl) polyhedral oligomeric silsesquioxanes) was collected. The structure was as follows:

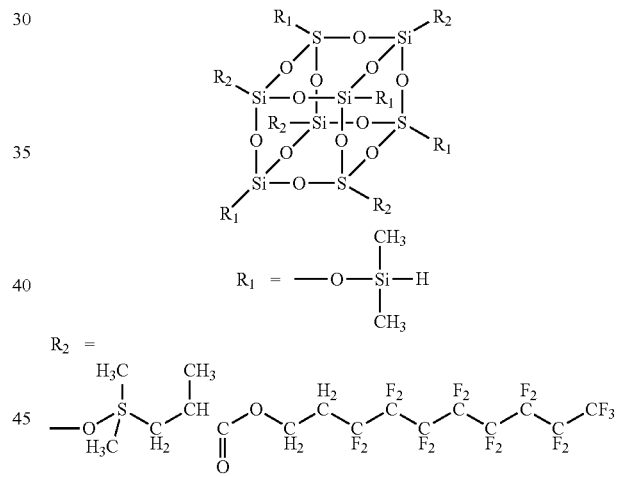

(2) Preparation of Polysiloxane/Fluorinated POSS Hybrid Anti-Icing Coatings:

Mixing 5 g prepared fluorinated POSS with 30 g poly(methylhydrosiloxane) (whose molecular weight is of 2000 to 2500 g/mol, p/q=3) and 35 g poly(methylvinylsiloxane) (whose molecular weight is of 25000 to 28000 g/mol, m/n=8) in 30 g benzotrifluoride in a beaker to form 70 wt % solution, and adding 100 μg chloroplatinic acid catalyst into the solution, then ultrasonic stirring for 1 h till the solution became homogeneous transparent. The coating was prepared by dipping a 20 cm×20 cm aluminium slide in the solution and cured at 80° C. for 3h in an oven after surface drying for 1 h at room temperature.

The contact angle hysteresis of the prepared coating is 7.2°, while ice shear strength 55 kPa and water contact angle 105°. According to SEM and AFM images, the wrinkle width is around 1.2 p.m, while the distance between adjacent wrinkles around 1.6 μm.

EXAMPLE 12

(1) Synthesis of Fluorinated POSS:

Mixing 20 g octakis(dimethylsiloxy)-T8-silsequioxane and 21.5 g perfluorodecyl ethylene in 96.8 g toluene in a reactor to form 30 wt % solution, then adding magnon for magnetic stirring, and introducing a $N_2$ gas for 30 min to remove air in the system, then adding 50 μg chloroplatinic acid catalyst into the solution dropwise for stirring at 80° C. for 12 h. After reaction finishes, applying reduced pressure distillation and vacuum drying to remove unreacted monomer and solvent. The crude product was vacuum dried overnight and fluorinated POSS (di ({3,3,4,4,5,5,6,6,7,7,8,8,9,9,10,10,11,11,12,12,12-heneicosafluorododecane} dimethysilyl) hexa (dimethysilyl) polyhedral oligomeric silsesquioxanes) was collected. The structure was as follows:

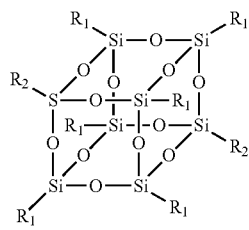

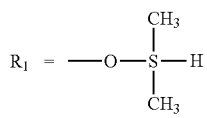

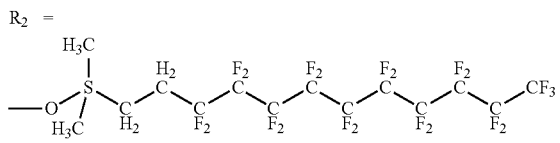

(2) Preparation of Polysiloxane/Fluorinated POSS Hybrid Anti-Icing Coatings:

Mixing 1 g prepared fluorinated POSS with 6 g poly (methylhydrosiloxane) (whose molecular weight is of 2500 to 3000 g/mol, p/q=5) and 10 g poly(methylvinylsiloxane) (whose molecular weight is of 28000 to 30000 g/mol, m/n=10) in 83 g benzotrifluoride in a beaker to form 17 wt % solution, and adding 100 μg chloroplatinic acid catalyst into the solution, then ultrasonic stirring for 1 h till the solution became homogeneous transparent. The coating was prepared by dipping a 20 cm×20 cm aluminium slide in the solution and cured at 80° C. for 3h in an oven after surface drying for 1h at room temperature.

The contact angle hysteresis of the prepared coating is 12.5°, while ice shear strength 60 kPa and water contact angle 106°. According to SEM and AFM images, the wrinkle width is around 1.6 μm, while the distance between adjacent wrinkles around 1.9 μm.

EXAMPLE 13

(1) Synthesis of Fluorinated POSS:

Mixing 20 g octakis(dimethylsiloxy)-T8-silsequioxane and 24.2 g (perfluorobutyl)ethylene in 71.6 g trichloromethane in a three-neck flask to form 30 wt % solutio, then adding magnon for magnetic stirring, and introducing a $N_2$ gas for 30 min to remove air in the system, and adding 50 μg Karstedts' catalyst into the solution dropwise for stirring at 90° C. for 36 h. After reaction finishes, applying reduced pressure distillation and vacuum drying to remove unreacted monomer and solvent and to obtain crude product. The crude product was vacuum dried for 24 h and fluorinated POSS (quadri ({3,3,4,4,5,5,6,6,6-nonafluorohexane} dimethysilyl) quadri (dimethysilyl) polyhedral oligomeric silsesquioxanes) was collected. The structure was as follows:

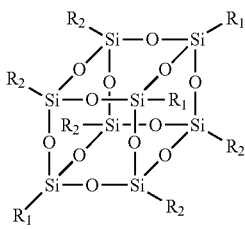

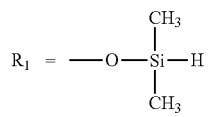

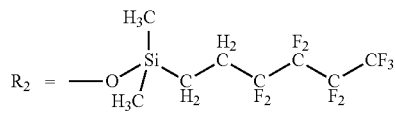

(2) Preparation of Polysiloxane/Fluorinated POSS Hybrid Anti-Icing Coatings:

Mixing 6 g prepared fluorinated POSS with 12 g poly (methylhydrosiloxane) (whose molecular weight is of 2500 to 3000 g/mol, p/q=1) and 11 g poly(methylvinylsiloxane) (whose molecular weight is of 25000 to 28000 g/mol, m/n=5) in 71 g dichloromethane in a beaker to form 29 wt % solution, and adding 167 μg chloroplatinic acid catalyst into the solution, then ultrasonic stirring for 1 h till the solution became homogeneous transparent. The coating was prepared by spin coating 10 mL solution under 600 r/min for 6 s firstly, then under 3000 r/min for 10 s on a 20 cm×20 cm aluminium slide and curing at 100° C. for 3 h in an oven after surface drying for 1 h at room temperature.

The contact angle hysteresis of the prepared coating is 5°, while ice shear strength is of 44 kPa and water contact angle is of 104°. According to SEM and AFM images, the wrinkle width is around 790 nm, while the distance between adjacent wrinkles around 800 nm.

Though various embodiments of the invention have been illustrated above, the description and the drawings are not the limitation to the invention. A person of ordinary skill in the art will understand that, variations and improvements made upon the illustrative embodiments fall within the scope of the invention, and the scope of the invention is only limited by the accompanying claims and their equivalents.

What is claimed is:

1. A polysiloxane/fluorinated polyhedral oligomericsilsesquioxanes (Fluorinated POSS) hybrid anti-icing coating, the coating comprising by weight percentage of Fluorinated POSS: 1-25%;
Hydrogen-containing polysiloxane: 5-30%;
Vinyl polysiloxane: 10-50%;
Catalyst: 0.0001%
The rest is solvent;
The structure of fluorinated POSS is as follows:

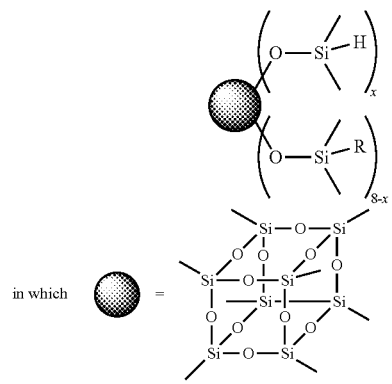

where, x represents the number of remaining Si-H groups, 2≤x≤6; R is selected from —CH$_2$CH$_2$(CF$_2$)$_y$CF$_3$ and —CH$_2$CH (CH$_3$)COOR$_f$, wherein y=3, 5, 7 or 9, R$_f$ comprises one selected from the group consisting of —CH$_2$CF$_2$CHFCF$_3$, —CH$_2$CH$_2$(CF$_2$)$_4$CHFCF$_3$, —CH$_2$CH$_2$(CF$_2$)$_5$CF$_3$ and —CH$_2$CH$_2$(CF$_2$)$_7$CF$_3$; x is analyzed by $^1$H-NMR, that is, x is calculated by integral areas of two H characteristic peaks of —SiH and methylene in —OSi(CH$_3$)$_2$CH$_2$— in $^1$H-NMR spectra of fluorinated POSS, the result is average value of a number of fluorinated POSS.

2. The polysiloxane/fluorinated POSS hybrid anti-icing coating according to claim 1, wherein the structure of hydrogen-containing polysiloxane is as follows:

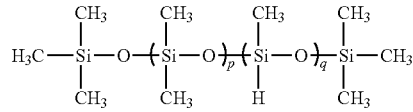

Wherein p/q=1~5.

3. The polysiloxane/fluorinated POSS hybrid anti-icing coating according to claim 1, wherein the molecular weight of hydrogen-containing polysiloxane ranges from 2000 to 3000 g/mol.

4. The polysiloxane/fluorinated POSS hybrid anti-icing coating according to claim 1, wherein the structure of vinyl polysiloxane is as follows:

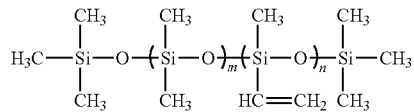

where, m/n=5~10.

5. The polysiloxane/fluorinated POSS hybrid anti-icing coating according to claim 1, wherein the molecular weight of vinyl polysiloxane ranges from 25000 to 30000 g/mol.

6. The polysiloxane/fluorinated POSS hybrid anti-icing coating according to claim 1, wherein the catalyst is selected from the group consisting of Karstedts catalyst and chloroplatinic acid catalyst.

7. The polysiloxane/fluorinated POSS hybrid anti-icing coating according to claim 1, wherein solvent comprises one selected from the group consisting of toluene, xylene, benzotrifluoride, dichloromethane, trichloromethane and tetrahydrofuran.

8. The polysiloxane/fluorinated POSS hybrid anti-icing coating according to claim 1, wherein the coating preparation method is as follows:

Dissolving fluorinated POSS, hydrogen-containing polysiloxane, vinyl polysiloxane and catalyst in solvent according to the above mass percentages to obtain solution, and ultrasonic stirring for 1-2 h till the solution become homogeneous transparent; then coating some solution on a substrate, and crosslinking at the temperature range from 80° C. to 120° C. for 2 to 4 h in an oven after surface drying at room temperature, thus obtaining polysiloxane/fluorinated POSS hybrid anti-icing coatings.

\* \* \* \* \*